United States Patent [19]

Hisaki et al.

[11] Patent Number: 5,122,397

[45] Date of Patent: Jun. 16, 1992

[54] METHOD OF TREATING POLYESTER FIBERS, POLYESTER FIBERS TREATED BY SAID METHOD, AND COMPOSITE COMPOSED OF SAID POLYESTER FIBERS AND NITRILE GROUP-CONTAINING HIGHLY SATURATED COPOLYMER RUBBER

[75] Inventors: Hiroshi Hisaki, Yokosuka; Osamu Mori, Kamakura; Motofumi Oyama, Yokosuka, all of Japan

[73] Assignee: Nippon Zeon Co., Ltd., Tokyo, Japan

[21] Appl. No.: 471,270

[22] Filed: Jan. 26, 1990

[30] Foreign Application Priority Data

Jan. 31, 1989 [JP] Japan ................................ 1-21998

[51] Int. Cl.⁵ .......................................... B05D 1/36
[52] U.S. Cl. ......................... 427/412; 427/208.2; 156/307.5
[58] Field of Search ............ 427/407.1, 412, 434.6, 427/207.1, 394, 381, 208.2; 156/307.5

[56] References Cited

U.S. PATENT DOCUMENTS

| | | | |
|---|---|---|---|
| 2,991,258 | 7/1961 | Haward | 156/307.5 |
| 3,051,594 | 8/1962 | Aitken | 156/307.5 |
| 3,190,764 | 6/1965 | Cardina | 427/333 |
| 3,222,238 | 12/1965 | Krysiak | 156/307.5 |
| 3,240,649 | 3/1966 | Atwell | 156/307.5 |
| 3,262,482 | 7/1966 | Clifton et al. | 156/307.5 |
| 3,868,985 | 3/1975 | Georges | 427/434.5 |
| 4,255,486 | 3/1981 | Burke, Jr. et al. | 524/510 |
| 4,285,756 | 8/1981 | Elmer | 156/334 |
| 4,405,746 | 9/1983 | Girgis | 156/910 |
| 4,409,055 | 10/1983 | Elmer | 427/434.6 |
| 4,569,963 | 2/1986 | Hisaki et al. | 156/910 |
| 5,017,639 | 5/1991 | Mori et al. | 524/510 |
| 5,032,454 | 7/1991 | Oyama et al. | 427/407.1 |

FOREIGN PATENT DOCUMENTS 0285094 10/1988 European Pat. Off.
2298590 8/1976 France.

*Primary Examiner*—Shrive Beck
*Assistant Examiner*—Diana L. Dudash
*Attorney, Agent, or Firm*—Sherman and Shalloway

[57] ABSTRACT

A method of treating polyester fibers, which comprises (1) treating the polyester fibers with an adhesive composition (AR) comprising a latex (A) of a vinylpyridine/conjugated diene copolymer having a vinylpyridine unit content of at least 20% by weight but not more than 70% by weight and a resorcinol-formaldehyde resin as main components, and (2) further treating it with an adhesive composition (BR) comprising a latex (B) of a nitrile group-containing highly saturated copolymer rubber having an iodine number of not more than 120 and a resorcinol-formaldehyde resin as main components. A composite obtained by bonding the treated polyester fibers to a nitrile group-containing highly saturated copolymer rubber by vulcanization has high initial and heat-resistant adhesion strength, and is useful for production of timing belts and polyribbed belts.

9 Claims, No Drawings

METHOD OF TREATING POLYESTER FIBERS, POLYESTER FIBERS TREATED BY SAID METHOD, AND COMPOSITE COMPOSED OF SAID POLYESTER FIBERS AND NITRILE GROUP-CONTAINING HIGHLY SATURATED COPOLYMER RUBBER

This invention relates to a method of treating polyester fibers, to polyester fibers treated by this method, and to a composite composed of the polyester fibers and a nitrile group-containing highly saturated copolymer rubber.

Composites of fiber and rubber are used in automobile timing belts, polyribbed belts, conveyor belts, hoses and diaphragms. An oil-resistant acrylonitrile/butadiene copolymer rubber (NBR) has previously been used as the rubber for such composites. Since in recent years, this rubber was required to have heat resistance to cope with size reduction of an engine room for weight reduction of automobiles, and also with the hermetic sealing of the engine room for noise control, a nitrile group-containing highly saturated copolymer rubber having high heat resistance and oil resistance has now gained widespread use. When nylon fibers, rayon fibers or aramid fibers treated with a latex of the nitrile group-containing highly saturated copolymer rubber are used, a composite of the nitrile group-containing highly saturated copolymer rubber with such fibers having a high adhesion strength can be obtained. However, when polyester fibers are used, the resulting belt articles have sufficient adhesion strength immediately after production (initial adhesion strength), but suffers from the disadvantage that depending upon the conditions for pre-treating the fibers or the processing temperature at which the fibers are treated after immersion in the latex, their adhesion strength after use at high temperatures (heat-resistant strength) is not reproducible. For this reason, the treatment of polyester fibers with the nitrile group-containing highly saturated copolymer rubber latex is not entirely satisfactory industrially.

The present inventors assiduously worked with a view to obtaining a composite composed of the nitrile group-containing highly saturated copolymer rubber and polyester fibers having both high initial adhesion strength and high heat-resistant adhesion strength, and have now found that this purpose is achieved by using polyester fibers treated by a specific method with adhesive compositions composed mainly of specific latices.

Thus, according to this invention, there are provided a method of treating polyester fibers, which comprises (1) treating an adhesive composition (AR) comprising a latex (A) of a vinylpyridine/conjugated diene copolymer having a vinylpyridine unit content of at least 20% by weight but not more than 70% by weight and a resorcinol-formaldehyde resin as main components, and (2) further treating it with an adhesive composition (BR) comprising a latex (B) of a nitrile group-containing highly saturated copolymer rubber having an iodine number of not more than 120 and a resorcinol-formaldehyde resin as main components; polyester fibers treated by this method; and a composite composed of a nitrile group-containing highly saturated copolymer rubber and the treated polyester fibers.

The vinylpyridine/conjugated diene copolymer constituting the latex (A) has a vinylpyridine unit content of at least 20% by weight but not more than 70% by weight, and from the viewpoint of adhesion strength, preferably has a vinylpyridine unit content of 25 to 60% by weight and a conjugated diene unit content of 40 to 75% by weight. Furthermore, the copolymer may contain not more than 40% by weight of units of another monomer so long as the other units do not impair the effect of the invention.

There is no limitation on the conjugated diene that can be used in the synthesis of the latex (A). Specific examples include aliphatic conjugated dienes such as 1,3-butadiene, isoprene, 2,3-dimethyl-1,3-butadiene, 1,3-pentadiene, and halogen-substituted butadiene. The conjugated dienes may be used singly or as a mixture.

2-Vinylpyridine is desirably used as the vinylpyridine for the synthesis of the latex (A). It may be replaced partly or wholly by at least one of 3-vinylpyridine, 4-vinylpyridine, 2-methyl-5-vinylpyridine, and 5-ethyl-2-vinylpyridine.

Examples of the monomer copolymerizable with the conjugated diene and vinylpyridine include aromatic vinyl compounds such as styrene, alpha-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene; unsaturated carboxylic acids such as acrylic acid, methacrylic acid, crotonic acid, cinnamic acid, itaconic acid, fumaric acid, maleic acid and butenetricarboxylic acid; esters of unsaturated monocarboxylic acids such as methyl acrylate, ethyl acrylate and methyl methacrylate; esters of unsaturated dicarboxylic acids such as ethyl itaconate, butyl fumarate and butyl maleate; unsaturated sulfonic acids or salts thereof, such as sodium sulfoethylacrylate, sodium sulfopropylmethacrylates and acrylamidepropanesulfonic acid; and aliphatic vinyl compounds such as ethylene, propylene, acrylonitrile and vinyl chloride. They may be used either alone or as a mixture of two or more of them.

The vinylpyridine-conjugated diene copolymer may be produced usually by emulsion polymerization. Other methods may also be used. There is no particular limitation on the method of adding monomers at the time of polymerization. All of the monomers used may be added at a time to a polymerization vessel and polymerized in one-step. It is possible to polymerize some of the monomers, add the remaining monomers at a time, and continuing the polymerization (two-step polymerization). There may also be used a method by which some monomers are polymerized and then the remaining monomers are added continuously or intermittently and polymerized.

The latex (A) may be directly produced by an emulsion-polymerization method, or by preparing an organic solvent solution of a copolymer obtained by another method, and then subjecting the solution to phase inversion.

The nitrile group-containing highly saturated copolymer constituting the latex (B) used in the method of this invention has an iodine number of not more than 120, preferably from the viewpoint of initial adhesion strength, not more than 100. Usually, the copolymer rubber has an alpha,beta-unsaturated nitrile unit content of 10 to 60% by weight. The nitrile group-containing highly saturated copolymer rubber may be one obtained directly as a polymer having an iodine number of not more than 120. Alternatively, a nitrile group-containing copolymer rubber having a higher iodine number obtained by using a larger proportion of a conjugated diene may be hydrogenated to give a copolymer rubber having an iodine number of not more than 120.

Examples of the nitrile group-containing highly saturated copolymer rubber include copolymers obtained by hydrogenating the conjugated diene units of alpha,-beta-unsaturated nitrile/conjugated diene copolymer rubbers; alpha,beta-unsaturated nitrile/conjugated diene/ethylenically unsaturated monomer terpolymers and products obtained by hydrogenating the conjugated diene units of these rubbers; and alpha,beta-unsaturated nitrile/ethylenically unsaturated monomer copolymer rubbers.

The alpha,beta-unsaturated nitrile used for the production of the nitrile group-containing highly saturated copolymer rubber latex may be one containing a nitrile group and a polymerizable unsaturated bond, and its specific examples are acrylonitrile and methacrylonitrile. Examples of a comonomer copolymerizable with the alpha,beta-unsaturated nitrile are conjugated dienes and ethylenically unsaturated monomers.

They may be the same conjugated dienes as those used for the preparation of the latex (A).

Examples of the ethylenically unsaturated monomer include unsaturated carboxylic acids such as acrylic acid, methacrylic acid, itaconic acid and maleic acid and salts thereof; esters of the above unsaturated carboxylic acids such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, ethyl itaconate, butyl fumarate, butyl maleate, methoxymethyl (meth)acrylate, ethoxyethyl (meth)acrylate and methoxyethoxy (meth)acrylate; (meth)acrylamide; N-substituted (meth)acrylamide such as N-methylol(meth)acrylamide, N,N'-dimethylol(meth)acrylamide and N-ethoxymethyl(meth)acrylamide; cyanoalkyl (meth)acrylates such as cyanohyl (meth)acrylate, 2-cyanoethyl (meth)acrylate, 1-cyanopropyl (meth)acrylate, 2-ethyl-6-cyanohexyl (meth)acrylate and 3-cyanopropyl (meth)acrylate; fluoroalkyl vinyl ethers such as fluoroethyl vinyl ether; and vinylpyridine.

The alpha,beta-unsaturated nitrile/ethylenically unsaturated monomer copolymer rubbers may be those in which part of units from the ethylenically unsaturated monomer is replaced by units from a nonconjugated diene such as vinylnorbornene, dicyclopentadiene and 1,4-hexadiene.

Ordinary techniques may be used for the polymerization of these monomers. Hydrogenation of the resulting copolymer rubber may also be carried out by ordinary methods.

Specific examples of the nitrile group-containing highly saturated copolymer rubber are hydrogenated products of butadiene/acrylonitrile copolymer rubber, isoprene/butadiene/acrylonitrile copolymer rubber and isoprene/acrylonitrile copolymer rubber; butadiene/methyl acrylate/acrylonitrile copolymer rubber, butadiene/acrylic acid/acrylonitrile copolymer rubber, and hydrogenation products of these; butadiene/ethylene/acrylonitrile copolymer rubber; butyl acrylate/ethoxyethyl acrylate/vinyl chloroacetate/acrylonitrile copolymer rubber; and butyl acrylate/ethoxyethyl acrylate/vinylnorbornene/acrylonitrile copolymer rubber.

The latex (B) may be prepared by subjecting a nitrile group-containing highly saturated copolymer rubber obtained by a solution-polymerization method, with or without subsequent hydrogenation, to an ordinary phase inversion method. Alternatively, it may be produced by hydrogenating a nitrile group-containing copolymer rubber latices having a high iodine number obtained by the emulsion polymerization method or the phase inversion method. The phase inversion method may be one described, for example, in Japanese Laid-Open Patent Publication No. 248879/1988.

So long as the essence of the present invention is not impaired, part of the latices in the adhesive composition (AR) and/or (BR) may be replaced by at least one of a styrene/butadiene copolymer rubber latex, a modified styrene/butadiene copolymer rubber latex, an acrylonitrile/butadiene copolymer rubber latex, a modified acrylonitrile/butadiene copolymer rubber latex, and natural rubber latices.

The resorcinol-formaldehyde resin used as one main component in the adhesive compositions may be a conventional one (for example, one disclosed in Japanese Laid-Open Patent Publication No. 142635/1980). There may also be used 2,6- bis(2,4-dihydroxyphenylmethyl)-4-chlorophenol, isocyanates, blocked isocyanates and ethyleneurea which have heretofore been used to enhance adhesion strength.

The adhesive composition (AR) comprises the latex (A) and the resorcinol-formaldehyde resin as main components, and the adhesive composition (BR) comprises the latex (B) and the resorcinol-formaldehyde resin as main components. In the adhesive composition (AR) or (BR), the amount of the resorcinol-formaldehyde resin is 10 to 180 parts by weight (dry weight) per 100 parts by weight of the solids of the latex (A) or (B).

The polyester fibers to be treated by the method of this invention may be fibers of any linear high-molecular-weight polyester comprising polyethylene terephthalate as a main component. For example, they may be the polyester fibers disclosed in Japanese Patent Publication No. 50184/1982. Usually they may be used in the form of a yarn, cord, continuous filament or fabric. They may be in another form.

In the present invention, the polyester fibers are first treated with the adhesive composition (AR) and then with the adhesive composition (BR).

There is no particular limitation on the procedure of treating the polyester fibers with the adhesive compositions (AR) and (BR), and the same procedure as used in the case of treating with a known resorcinolformaldehyde resin/polymer latex adhesive composition may be used in this invention. One example is as follows: The polyester fibers are first immersed in the adhesive composition (AR) and heat-treated after optionally they are dried. There is no particular limitation on the heating conditions. The heating may be carried out at a temperature and for a time sufficient to react the adhesive composition adhering to the polyester fibers by immersion. Usually, the heating temperature is about 140° to about 250° C., and the heating time is several minutes. The fibers are then immersed in the adhesive composition (BR) and after optional drying, are heat-treated. The heat-treatment conditions may be the same as in the case of using the adhesive composition (AR). Prior to the immersion of the polyester fibers, the fibers may be immersed in a solution of an isocyanate compound, or a dispersion of an epoxy compound, or a mixture of both, and then dried. Desirably, the drying temperature in this case is below the drying temperature employed after immersion in the adhesive composition.

There is no particular limitation on the total amount of solids of the adhesive compositions taken up on the fibers. It is usually 2 to 20% by weight, preferably 3 to 10% by weight, based on the weight of the polyester fibers. The ratio of the amount of the solids of the adhesive composition (AR) to that of the solids of the adhesive composition (BR) is neither restricted, but usually from 50:50 to 80:20.

A composite in accordance with the invention composed of a nitrile group-containing highly saturated rubber and polyester fibers can be obtained by bonding the resulting polyester fibers of the invention to the above rubber by vulcanization.

In the composite of this invention, the nitrile group-containing highly saturated copolymer rubber to be bonded to the polyester resin upon vulcanization may be the same as the nitrile group-containing highly saturated copolymer rubber used in the latex (B).

There is no particular limitation on the method of producing the composite of this invention by bonding the nitrile group-containing highly saturated rubber to the polyester fibers upon vulcanization, and any method used heretofore in the bonding of rubber to fibers by vulcanization may be used. Specifically, it can be achieved by embedding the polyester fibers in a rubber compound prepared by blending compounding agents such as a vulcanizer and a filler with the rubber, and then vulcanizing the rubber compound. The vulcanization is carried out usually at 120° to 180° C. under a pressure of 0.5 to 10 MPa for 1 to 120 minutes.

The composite of this invention consisting of the nitrile group-containing highly saturated copolymer rubber and the polyester fibers treated by the method of this invention has en excellent initial adhesion strength and can retain a high adhesion strength after it has been used for a long period of time at high temperatures as compared with a conventional composite obtained from the nitrile group-containing highly saturated copolymer rubber and conventional polyester fibers. Accordingly, it is suitable for use as timing belts, polyribbed belts, etc.

The following examples illustrate the invention more specifically. In the following Examples and Comparative Examples, all parts and percentages are by weight unless otherwise specified.

Preparation of latex (A)

An autoclave equipped with a stirrer was charged with 100 parts of each of the monomeric mixtures indicated in Table 1, 150 parts of water, 0.1 part of tetrasodium ethylenediaminetetraacetate, 5 parts of sodium laurylsulfate, 0.5 part of sodium hydrogen carbonate, 0.5 part of t-dodecylmercaptan and 0.3 part of potassium persulfate, and with stirring, they were reacted at 60° C. When the conversion reached 95%, 0.05 part of hydroquinone was added to stop the reaction. The pressure was reduced, and the unreacted monomers were removed.

Thus, latices A-1 to A-6 were obtained.

In the same way as above, latices C-1 and C-2 were obtained by using the monomeric mixtures indicated in Table 1.

TABLE 1

| | Composition of the monomeric mixture Latex No. | | | | | | | |
|---|---|---|---|---|---|---|---|---|
| | A-1 | A-2 | A-3 | A-4 | A-5 | A-6 | C-1 | C-2 |
| Butadiene | 63 | 59 | 57 | 55 | 45 | 32 | 70 | 25 |
| 2-Vinyl-pyridine | 22 | 26 | 28 | 30 | 55 | 68 | 15 | 75 |

TABLE 1-continued

| | Composition of the monomeric mixture Latex No. | | | | | | | |
|---|---|---|---|---|---|---|---|---|
| | A-1 | A-2 | A-3 | A-4 | A-5 | A-6 | C-1 | C-2 |
| Styrene | 15 | 15 | 15 | 15 | — | — | 15 | — |

Preparation of latex (B)

Acrylonitrile/butadiene copolymer rubber obtained by emulsion polymerization (NBR, the amount of bound acrylonitrile 37%) was dissolved in methyl isobutyl ketone, and its butadiene portion was hydrogenated by using a palladium-carbon catalyst to give hydrogenated NBR having an iodine number 80. Sixty parts of the hydrogenated NBR was dissolved in 540 parts of a mixture of 50% by volume of methyl ethyl ketone and 50% by volume of cyclohexane. With stirring by a homomixer (model M supplied by Tokushu Kika Kogyo K. K.), 32 parts of a 15% aqueous solution of potassium oleate adjusted to a pH of 11.5 with potassium hydroxide and 600 parts of water were added, and then the mixture was stirred for 10 minutes at 12,000 revolutions per minute to form an emulsion. The emulsion was steam-stripped to remove the solvents, and the residue was concentrated by an evaporator to give a latex having a solids concentration of about 30%. It was then centrifuged at room temperature at 10,000 revolutions per minute for 16 minutes by using a centrifugal separator (type H251 made by Kokusan En-shinki K. K.) to give a latex B-1 having a solids concentration of 40%. In the same way as above, a latex B-2 having a solids concentration of 40% was prepared from hydrogenated NBR having an iodine number of 28.

Furthermore, an NBR latex having a solids concentration of about 30% (the iodine number of NBR 248, bound acrylonitrile 37%) was prepared by emulsion polymerization. This latex is designated as latex D-1.

Preparation of an adhesive composition (AR)

Resorcinol (16.6 parts), 14.6 parts of a 37% aqueous solution of formaldehyde and 1.3 parts of sodium hydroxide were dissolved in 333.5 parts of water, and reacted at 25° C. for 2 hours with stirring. One hundred parts of the latex (A) was added to the resulting solution and reacted at 25° C. for 20 hours with stirring. Then, 80 parts of Vulcabond E (a product of Vulnax Co.) was added, and the solids concentration of the aqueous solution was adjusted to 20% to give an adhesive composition (AR) corresponding to the latex (A).

Preparation of an adhesive composition (BR)

Resorcinol (11 parts), 16.2 parts of a 37% aqueous solution of formaldehyde and 0.3 part of sodium hydroxide were dissolved in 238.5 parts of water, and reacted at 25° C. for 6 hours with stirring. One hundred parts of the latex (B), 22.6 parts of aqueous ammonia (concentration 14%) and 47.9 parts of water were added to the resulting solution, and the mixture was reacted at 25° C. for 20 hours with stirring to give an adhesive composition (BR) corresponding to the latex (B).

Preparation of a rubber compound for bonding

In accordance with the compounding recipe shown in Table 2, the nitrile group-containing highly saturated copolymer rubber and the compounding agents were kneaded on a roll to prepare a rubber compound in the form of a sheet having a thickness of about 2.5 mm.

TABLE 2

| Compounding Recipe Ingredients | Amount (parts) |
|---|---|
| Zetpol 2020 (*1) | 100 |
| Zinc flower #1 | 5 |
| Stearic acid | 1 |
| SRF carbon black | 40 |
| Sulfur | 0.5 |
| Tetramethyl thiuram disulfide | 1.5 |
| 2-Mercaptobenzothiazole | 0.5 |

(*1): a product of Nippon Zeon Co., Ltd. having an iodine number of 28 and a bound acrylonitrile content of 36 %.

EXAMPLE 1

Polyester cords (structure 1100 d/2×3) were each dip-treated with the adhesive composition AR-4 obtained by using the latex A-4 by a testing single cord dipping machine, and then heat-treated at 245° C. for 1 minute. The resulting cords were then immersed in the adhesive composition BR-1 and then heat-treated at 245° C. for 1 minute.

The polyester cords were embedded in the rubber compound prepared in accordance with the compounding recipe of Table 2 to an embedding length of 8 mm. The rubber compound was press-cured at 150° C. under a pressure of 5 MPa for 30 minutes to obtain a fiber-rubber composite.

The initial adhesion strength of the composite was measured by conducting a cord peeling test in accordance with ASTM-D-2630. A composite obtained in the same manner as above was heat-treated in an air oven at 120° C. for 168 hours, and then subjected to the cord peeling test to determine its heat-resistant adhesion strength. The results are shown in Table 3 (Run No. 2).

COMPARATIVE EXAMPLES 1 and 2

Composites were prepared in the same way as in Example 1 except that the dipping treatment with the adhesive composition AR-4 or the dipping treatment with the adhesive composition BR-1 was not carried out. The initial adhesion strength and the heat-resistant adhesion strength of the composites were measured. The results are shown in Table 3 (Runs Nos. 1 and 3).

TABLE 3

|  |  | Comparative Example 1 | Example 1 | Comparative Example 2 |
|---|---|---|---|---|
|  |  | Run No. | | |
|  |  | 1 | 2 | 3 |
| Latex used in | (AR) | A-4 | A-4 | — |
| the preparation | (Br) | — | B-1 | B-1 |

TABLE 3-continued

|  | Comparative Example 1 | Example 1 | Comparative Example 2 |
|---|---|---|---|
|  | Run No. | | |
|  | 1 | 2 | 3 |
| of the adhesive composition | | | |
| Initial adhesion strength (kg/25 mm) | 2.4 | 25.5 | 2.50 |
| Heat-resistant adhesion strength (kg/25 mm) | 2.0 | 15.2 | 2.1 |

The results given in Table 3 show that when the polyester cords treated with the adhesive composition (AR) and (BR) were used, a composite having an excellent initial adhesion strength and an excellent heat-resistant adhesion strength was obtained, but that when the polyester cords treated with either one of the adhesive composition (AR) or (BR) were used, the resulting composites had an inferior initial adhesion strength or an inferior heat-resistant adhesion strength.

EXAMPLE 2

As in Example 1, polyester cords were dip-treated by using each of the adhesive compositions AR-1, AR-2, AR-5 and AR-6 prepared from latices A-1, A-2, A-5 and A-6 respectively and an adhesive composition BR-1 prepared from the latex B-1. Composites were obtained from these polyester cords and a rubber compound prepared in accordance with the compounding recipe in Table 2 in the same way as in Example 1. These resulting composites were subjected to a cord peeling test in the same way as in Example 1 to measure their initial and heat-resistant adhesion strengths. The results are shown in Table 4 (Runs Nos. 5 to 8).

COMPARATIVE EXAMPLES 3 and 4

Composites were prepared as in Example 2 except that the latex C-1 or C-2 was used instead of the latex A-1, and their initial and heat-resistant adhesion strengths were measured. The results are shown in Table 4 (Run Nos. 4 and 9).

TABLE 4

|  |  | Comparative Example 3 | Example 2 | | | | Comparative Example 4 |
|---|---|---|---|---|---|---|---|
|  |  | Run No. | | | | | |
|  |  | 4 | 5 | 6 | 7 | 8 | 9 |
| Latex used in the preparation of the adhesive composition | (AR) | C-1 | A-1 | A-2 | A-5 | A-6 | C-2 |
|  | (BR) | B-1 | B-1 | B-1 | B-1 | B-1 | B-1 |
| Initial adhesion strength (kg/25 mm) | | 25.5 | 25.5 | 25.1 | 25.2 | 25.5 | 25.3 |
| Heat-resistant adhesion strength (kg/25 mm) | | 2.6 | 8.7 | 12.1 | 15.0 | 9.3 | 3.0 |

The results given in Table 4 show that when polyester cords treated with an adhesive composition prepared from a latex having a vinylpyridine unit content of at least 20% by weight but not more than 70% by weight were used, composites having excellent initial and heat-resistant adhesion strengths were obtained, but that when adhesive compositions prepared from latex (C-1) having a vinylpyridine unit content of less than 20% by weight or a latex having a vinylpyridine unit content of more than 70% by weight were used, the resulting composites had only an inferior heat-resistant adhesion strength.

EXAMPLE 3

Polyester cords were dip-treated in the same way as in Example 1 using the adhesive composition AR-3 and the adhesive composition BR-1, or the adhesive composition AR-4 and the adhesive composition BR-2. Then, composites were prepared in the same way as in Example 1 from these treated polyester cords and a rubber compound prepared in accordance with the compounding recipe shown in Table 2. The composites were subjected to a cord peeling test in the same way as in Examples 1, and their initial and heat-resistant adhesion strength were measured. The results are shown in Table 5 (Run Nos. 10 and 11).

COMPARATIVE EXAMPLE 5

A composite was prepared in the same way as in Example 3 except that the latex D-1 was used instead of the latex B-1. The initial and heat resistant adhesion strength of the composite were measured, and the results are shown in Table 5 (Run No. 12).

TABLE 5

|  |  | Example 3 | | Comparative Example 5 |
| --- | --- | --- | --- | --- |
|  |  | Run No. | | |
|  |  | 10 | 11 | 12 |
| Latex used in | (AR) | A-3 | A-4 | A-4 |
| the preparation | (BR) | B-1 | B-2 | D-1 |
| of the adhesive composition |  |  |  |  |
| Initial adhesion strength (kg/25 mm) |  | 25.5 | 26.0 | 3.3 |
| Heat-resistant adhesion strength (kg/25 mm) |  | 14.0 | 15.7 | 2.5 |

The results given in Table 5 show that when polyester cords of the invention treated with the adhesive compositions (AR) and (BR) were used, composites having excellent initial and heat-resistant adhesion strengths were obtained but that when an adhesive composition prepared from the latex D-1 of a nitrile group-containing copolymer rubber having an iodine number of more than 120 was used instead of the adhesive composition BR, the resulting composite had inferior initial and heat-resistant adhesion strengths.

EXAMPLE 4 and COMPARATIVE EXAMPLE 6

The initial and heat-resistant adhesion strengths were measured as in Example 1 except that in the treatment of polyester cords, the heat-treatment of the cords after immersion in the adhesive compositions was carried out at 230° C. Excellent results were obtained with good reproducibility.

A fiber-rubber composite obtained in the same way as in Comparative Example 2 except that the temperature for heat-treatment of the polyester cords was 230° C. or above, was subjected to the same test as above. It had a good initial strength with good reproducibility, but its heat-resistant strength greatly varied, and no reproducibility was observed.

We claim:

1. A method of treating polyester fibers, which comprises
   (1) treating the polyester fibers with an adhesive composition (AR) comprising a latex (A) of a vinylpyridine/conjugated diene copolymer having a vinylpyridine unit content of at least 20% by weight but not more than 70% by weight and a resorcinol-formaldehyde resin as main components, and
   (2) further treating it with an adhesive composition (BR) comprising a latex (B) of a nitrile group-containing highly saturated copolymer rubber having an iodine number of not more than 120 and a resorcinolformaldehyde resin as main components.

2. The method of claim 1 in which the vinylpyridine/conjugated diene copolymer latex (A) is a latex of a copolymer composed of 25 to 60% by weight of vinylpyridine units and 40 to 75% by weight of the conjugated diene units.

3. The method of claim 1 in which the vinylpyridine/conjugated diene copolymer latex (A) is a latex of a copolymer composed of 20 to 70% by weight of vinylpyridine units, 30 to 80% by weight of conjugated diene units, and not more than 40% by weight of units of another monomer copolymerizable with these monomers.

4. The method of claim 3 in which the other monomer is styrene.

5. The method of claim 1 in which the copolymer rubber in the latex (B) has an iodine number of not more than 100.

6. The method of claim 1 in which the latex (B) is a latex of a nitrile group-containing highly saturated copolymer rubber containing 10 to 60% by weight of alpha,beta-unsaturated nitrile units.

7. The method of claim 1 in which the amount (dry weight) of the resorcinol-formaldehyde resin in the adhesive resin composition is 10 to 180 parts by weight per 100 parts by weight of the solids of the latex (A), and the amount (dry weight) of the resorcinol-formaldehyde resin in the adhesive composition (BR) is 10 to 180 parts by weight per 100 parts by weight of the solids of the latex (B).

8. The method of claim 1 in which the treatment of the polyester fibers is carried out so that the total amount of the solids of the resin compositions taken up on the fibers is 2 to 20% by weight of the polyester fibers.

9. The method of claim 1 in which the weight ratio of the solids of the adhesive composition (AR) to that of the adhesive composition (BR) is from 50:50 to 80:20.

* * * * *